United States Patent [19]

Grethe et al.

[11] Patent Number: 4,682,991
[45] Date of Patent: Jul. 28, 1987

[54] METHOD AND APPARATUS FOR SCRUBBING FLUE GAS WITH FLOWABLE ABSORBING MATERIAL PURSUANT TO THE AIR FLOW ATOMIZATION PRINCIPLE

[75] Inventors: Klaus Grethe; Hubert Steven, both of Gummersbach, Fed. Rep. of Germany

[73] Assignee: L. & C. Steinmüller GmbH, Gummersbach, Fed. Rep. of Germany

[21] Appl. No.: 827,787

[22] Filed: Feb. 7, 1986

[30] Foreign Application Priority Data

Feb. 7, 1985 [DE] Fed. Rep. of Germany ....... 3504167

[51] Int. Cl.⁴ .......................... B01D 3/26; B01D 53/18
[52] U.S. Cl. ............................................ 55/84; 55/94; 55/223; 55/238; 55/240; 261/78.2; 261/DIG. 75
[58] Field of Search .................. 55/84, 93, 94, 223, 55/224, 235, 237, 238, 240; 261/78 A, 79 A, 112, 116, 118, DIG. 75

[56] References Cited

U.S. PATENT DOCUMENTS

| | | | |
|---|---|---|---|
| 1,922,075 | 8/1933 | Brelsford | 261/112 X |
| 2,200,891 | 5/1940 | Nyborg | 55/223 |
| 2,687,614 | 8/1954 | Goddard | 261/116 x |
| 2,797,904 | 7/1957 | Voorheis | 261/118 X |
| 2,883,167 | 4/1959 | Krantz | 261/78 A X |
| 3,181,287 | 5/1965 | Rabson | 261/116 X |
| 3,347,024 | 10/1967 | Dock et al. | 261/112 X |
| 3,556,489 | 1/1971 | Ueda | 261/118 X |
| 3,584,440 | 6/1971 | Vigil | 55/240 X |
| 3,646,607 | 2/1972 | Dower | 261/DIG. 75 |
| 3,795,486 | 3/1974 | Ekman | 55/240 X |
| 3,811,249 | 5/1974 | Arnold et al. | 55/240 X |
| 3,885,918 | 5/1975 | Isahaya | 55/238 X |
| 3,989,488 | 11/1976 | Wisting | 55/238 |
| 4,544,379 | 10/1985 | Elliott et al. | 55/94 X |
| 4,578,226 | 3/1986 | Adlhoch et al. | 261/118 X |

FOREIGN PATENT DOCUMENTS

| | | | |
|---|---|---|---|
| 1471634 | 10/1969 | Fed. Rep. of Germany | 55/235 |
| 2620855 | 1/1977 | Fed. Rep. of Germany | 55/235 |
| 1031473 | 7/1983 | U.S.S.R. | 55/238 |

Primary Examiner—Robert Spitzer
Attorney, Agent, or Firm—Becker & Becker, Inc.

[57] ABSTRACT

A method and apparatus for scrubbing flue gas that is charged with noxious material. Scrubbing is accomplished via flowable absorption material in a gas-scrubbing unit having an atomizing device with at least one independent nozzle in which, pursuant to the air flow atomization principle, the absorbing material, as atomizing material, is atomized in parallel flow with a gas, as an atomizing medium, to form a fine droplet stream while at the same time the atomizing material and the atomizing medium are intensely mixed. Atomizing material is introduced into a nozzle in such a way that the material forms a film on one side of an atomizer edge disposed in the nozzle. Each atomizing medium stream is split into two partial streams. One of these partial streams is passed through a given nozzle in such a way that it passes over the film of atomizing material in the direction toward the nozzle outlet, so that the film is forced toward the outlet, where it is atomized via the atomizer edge, as is passes thereover, to form a fine droplet stream. The other partial stream is passed through the nozzle on that side of the atomizer edge remote from the film of atomizing material, where it is mixed with the fine droplet stream.

19 Claims, 12 Drawing Figures

METHOD AND APPARATUS FOR SCRUBBING FLUE GAS WITH FLOWABLE ABSORBING MATERIAL PURSUANT TO THE AIR FLOW ATOMIZATION PRINCIPLE

BACKGROUND OF THE INVENTION

The present invention relates to a method and apparatus for scrubbing flue gas that is charged with noxious material, with the scrubbing being accomplished via flowable absorbing material in a gas-scrubbing unit having an atomizing device with at least one independent nozzle in which, pursuant to the gas-spraying or air flow atomization principle, the absorbing material, as atomizing material, is atomized in parallel flow with a gas, as an atomizing medium, to form a fine droplet stream while at the same time the atomizing material and the atomizing medium are intensely mixed.

Methods and apparatus are known for atomizing additive suspensions, in the form of flowable absorbing material, in flue gas scrubbing units. These methods and apparatus are based on various atomizing methods depending upon the type of scrubbing unit.

Thus, for example, atomizers operating pursuant to the "rotary-disk" principle are known for flue gas scrubbing units which are designed as spray-absorption-dryers. These atomizers essentially comprise a high speed disk that receives atomizing material. Due to the resulting centrifugal forces, the atomizing material is flung over the edge of the disk, which produces a hollow conical stream of drops. The flue gas and the additive suspension are supplied to the reactor at different locations. An optimum mixing of the two streams cannot be achieved under these conditions. The flue gas that flows by it also causes atomizing material to cake onto the disk since the flue gas reacts with the additive suspension on that side of the disk that is not directly supplied, and/or because reaction products are transported to such locations. This caking action adversely affects the quality of the atomization. Another drawback to this heretofore known atomizer is the equipment itself, which includes rotating structural elements and the mechanical stresses associated therewith.

Flue gas scrubbing units utilizing the wetwash process frequently operate with pressure spray guns or atomizers. With such atomizers, the additive suspension is supplied to the atomizer nozzle at high pressure. In several embodiments, the flow of the additive suspension into the nozzle is swirled, with the additive suspension being atomized as it exits due to the forces resulting from the drop in pressure. Compared to other atomizing systems, the pressure atomizers produce drops having a relatively large diameter. However, a particular drawback of such pressure atomizers is that the required atomization quality is provided only at design pressure, so that relatively poorer results are produced at partial load operation. These drawbacks are not eliminated by undertaking various modifications of the pressure atomizer. For example, a nozzle has been used that due to the relatively large inner volume of the nozzle and the large outlet opening thereof effects an acceleration of the atomizing material already in the nozzle. Swirling the stream produces a relatively wide hollow conical stream of drops at the outlet of the nozzle. However, the previously mentioned drawbacks relative to an inadequate mixing between the additive and the flue gas are still present.

It is therefore an object of the present invention to provide, in flue gas scrubbing units which are designed to operate pursuant to either spray absorption or the wet wash process, a high quality atomization of the additive suspension accompanied by simultaneous intensive mixing with the flue gas, even for partial load operation, without having the process be adversely affected by additive being caked on in or to the atomizer.

BRIEF DESCRIPTION OF THE DRAWINGS

This object, and other objects and advantages of the present invention, will appear more clearly from the following specification in conjunction with the accompanying drawings, in which:

FIG. 1*a* is a schematic view of a vertical axially symmetrical gas scrubbing vessel having disposed in the center of the top of the vessel one inventive embodiment of an atomizing device;

FIG. 1*b* is a detailed view of the atomizing device of the dot-dash encircled portion of FIG. 1*a;*

FIG. 2*a* is a schematic view taken along the line II*a*—II*a* in FIG. 2*b* and shows a vertical axially symmetrical gas scrubbing vessel having a spray-nozzle tube and a tangentially disposed atomizing device;

FIG. 2*b* is a schematic cross-sectional view of the vessel illustrated in FIG. 2*a;*

FIG. 3*a* is a detailed view of one possible embodiment of the atomizing device of the vessel illustrated in FIGS. 2*a* and 2*b;*

FIG. 3*b* is a detailed view of the atomizing device of FIG. 3*a* taken along the line III*b*—III*b* of the latter;

FIG. 4*a* is a detailed view of a further possible embodiment of the atomizing apparatus of the vessel illustrated in FIGS. 2*a* and 2*b;*

FIG. 4*b* is a detailed view of the atomizing apparatus of FIG. 4*a* taken along the line IV*b*—IV*b* of the latter;

FIG. 5*a* is a detailed view of a third possible embodiment of the atomizing apparatus of the vessel illustrated in FIGS. 2*a* and 2*b;*

FIG. 5*b* is a detailed view of the atomizing device of FIG. 5*a* taken in the direction 90° to the latter;

FIG. 6*a* is a schematic view of another vertical axially symmetrical gas scrubbing vessel having a plurality of tangentially disposed atomizing devices of the type illustrated in one of the FIGS. 3*a,* 4*a,* and 5*a;* and FIG. 6*b* is a schematic cross-sectional view of the vessel illustrated in FIG. 6*a.*

SUMMARY OF THE INVENTION

The method of the present invention includes the following steps: introducing atomizing material into a given nozzle in such a way that the material forms a film on one side of an edge means that is provided in the nozzle; splitting each atomizing medium stream into two partial streams; passing one of the partial streams through a given nozzle in such a way that is passes over the film of atomizing material on one side of the edge means in the direction toward the nozzle outlet, so that the film of atomizing material is forced toward the outlet, where it is atomized via the edge means as it passes thereover to form a fine droplet stream; and passing the other of the partial streams through the nozzle on that side of the edge means remote from the film of atomizing material, and mixing this other partial stream with the fine droplet stream.

To increase the atomizing effect, and with regards to a special configuration, of the nozzlelike flow, in the event of an axially symmetrical independent nozzle, either the atomizing material stream, or the atomizing medium stream, or both streams, are swirled in the same or opposite directions of rotation.

It is furthermore proposed that as the atomizing medium either a partial stream of the flue gas, or air or steam be used.

The atomizing material can be an additive suspension of water and calcium hydroxide or calcium carbonate with a solid content of between 6 and 30% by weight.

To achieve an optimum atomizing quality, the mass flow ratio between the atomizing medium and the atomizing material should be at least 0.3, but can be any value greater than this.

To produce the required drop size in a wet flue gas wash, the pressure of the atomizing medium at the nozzle inlet should be at least 100 mm column of water.

To scrub flue gas in a unit designed as a spray-absorption-dryer, the pressure of the atomizing medium at the inlet of the nozzle should be greater than 500 mm column of water if the mass flow ratio between the atomizing medium and the atomizing material is less than 1.

If the ratio of the mass streams of the atomizing medium and the atomizing material is greater than 1, the pressure of the atomizing medium at the inlet of the nozzle should be at least 100 mm column of water.

It is further proposed that in the event that flue gas scrubbing is accomplished with dry additive as the atomizing material, water be used to condition the flue gas ahead of the reactor.

It is also possible to provide any desired partial load operation of the flue gas scrubbing unit for mass flow ratios between the atomizing medium and the atomizing material of greater than 2, while maintaining the same atomizing quality, by varying the individual flows, whereby the individual flows can be varied nearly independently of one another.

The required atomizing quality for any partial load operation of the flue gas scrubbing unit at mass flow ratios between the atomizing medium and the atomizing material in the range of 0.3 to 2 can be assured by the fact that the individual flows can be varied nearly independently of one another.

Pursuant to one exemplary inventive apparatus for carrying out the method of the present invention, each nozzle of the apparatus is characterized by edge means that end adjacent the nozzle outlet and have two sides; the nozzle has at least one first opening, disposed remote from the outlet of the nozzle, for supplying atomizing material to one side of the edge means; the nozzle has second opening means, also disposed remote from the outlet of the nozzle, for supplying a first partial stream of atomizing medium to that side of the edge means that is supplied with atomizing material; the nozzle also has a third opening means for supplying a second partial stream of atomizing medium to the other side of the edge means.

Each independent nozzle may be an axially symmetrical nozzle in which the opening for the atomizing material, i.e. the first opening means, is an annular gap, or a number of individual openings, disposed over the entire periphery of the nozzle.

It is also possible to provide each independent nozzle either with a tangential inlet into the nozzle, or with other elements, to provide a parallel or countercurrent swirling for the flow of the atomizing medium and/or the atomizing material.

Finally, each independent nozzle maybe a flat or plate-type nozzle in which the opening for the atomizing material is a linear gap, or a number of individual openings, disposed over the entire width of the nozzle.

These and other specific features of the present invention will be described in detail subsequently.

DESCRIPTION OF PREFERRED EMBODIMENTS

Figure 1A:
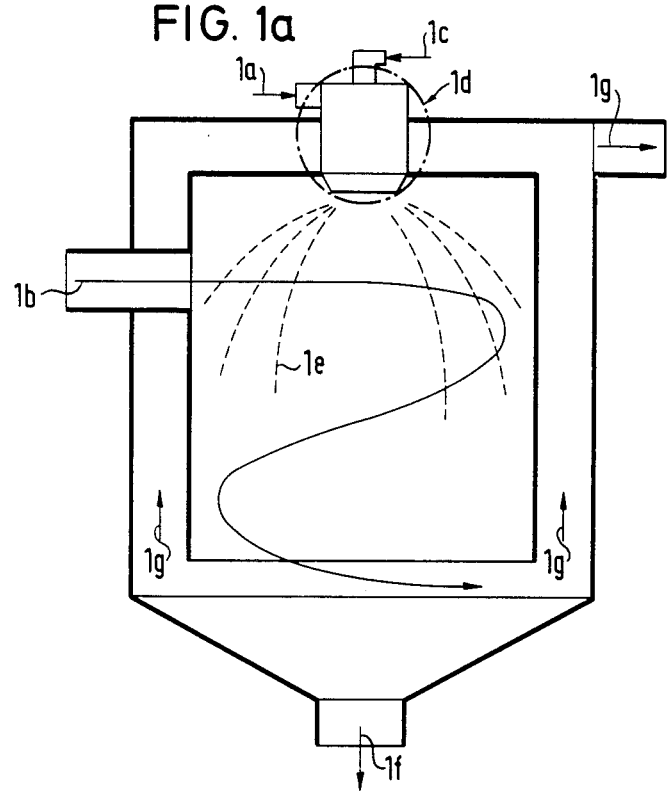
Figure 1B:
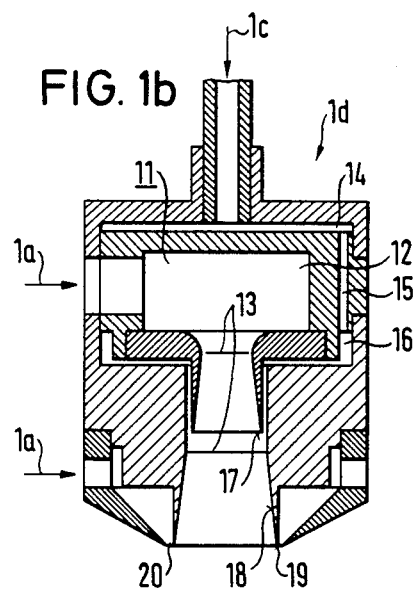

Referring now to the drawings in detail, FIG. 1a illustrates a vertical axially symmetrical vessel that is in the form of a spray-absorption-dryer or wet washer for scrubbing flue gas. Disposed in the center of the top of the vessel is an atomizing device 1d that includes an atomizing nozzle 11 (FIG. 1b). A dense and for the most part homogeneous mist of drops 1e is produced by introducing, at 1a, all of the flue gas or a partial stream of the flue gas, or in place there of air or steam, as atomizing medium to the nozzle 11, and by introducing, at 1c, an additive suspension as atomizing material. This mist of drops 1e fills the available reactor space. A portion of the flue gas, or all of the flue gas if air or steam are used as the atomizing medium, can be introduced into the vessel via an inlet 1b.

If the vessel is a spray-absorption-dryer, reaction products having a large particle size are separated from the gas stream in the lower region of the vessel, and are withdrawn via an outlet 1f. The scrubbed flue gas, which is nonetheless charged with flue dust, leaves the vessel via an outlet 1g.

If the vessel is in the form of a wet washer, the drops are to a large extent separated from the flue gas in the lower portion of the vessel, where they initially remain in the sump that is disposed above the outlet 1f. The flue gas is withdrawn via the outlet 1g, and is conveyed to a non-illustrated drop separator.

The exemplary embodiment of an atomizing device 1d illustrated in FIG. 1b essentially comprises an axially symmetrical atomizing nozzle 11. The inlets 1a for the atomizing medium can be arranged in such a way that a tangential inflow produces a swirled flow of the atomizing medium. The swirled main stream of the atomizing medium flows via a nozzle intake 12 into a nozzle passage 13. The atomizing material, or material that is to be atomized, flows through the inlet 1c into the nozzle and is conveyed via a distribution system 14, 15, 16 to a continuous opening 17 on the periphery of the nozzle. A film formed on the wall 18 of the nozzle is forced by the flow of the atomizing medium to the atomizer edge 19. Another portion of the atomizing medium flows via a gap 20 to the other side of the atomizer edge 19, thus preventing material from caking on the nozzle.

Figure 2A:
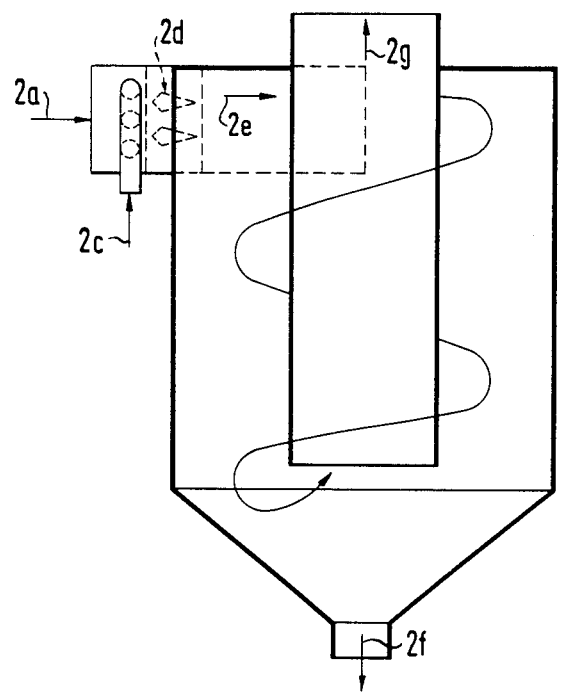
Figure 2B:
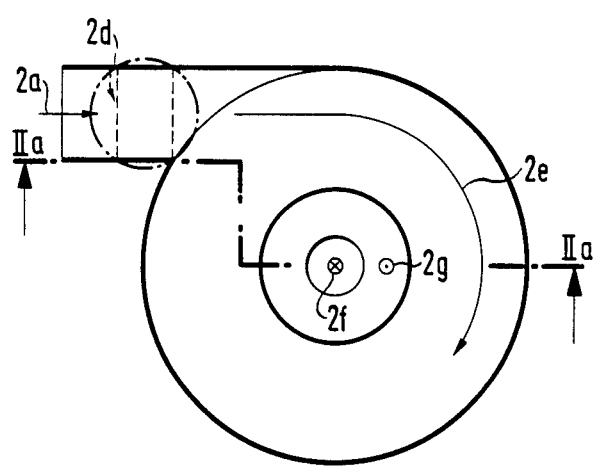

FIGS. 2a and 2b illustrate a different exemplary embodiment in the form of a wet washer having a small to average capacity. This wet washer comprises a vertical axially symmetrical vessel having a spray-nozzle 2. The flue gas, as the atomizing medium, flows into the wet washer via a tangential inlet 2a, and in so doing flows through an atomizing device 2d. FIGS. 3a to 5b show three exemplary embodiments for such an atomizing device 2d. These embodiments will now be described in detail.

Figure 3A:
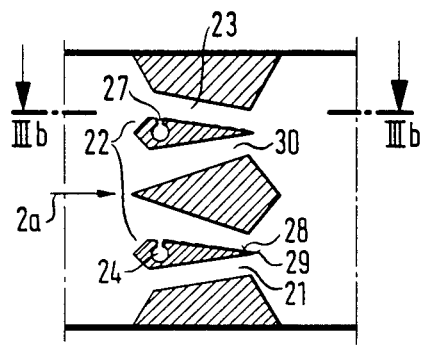
Figure 3B:
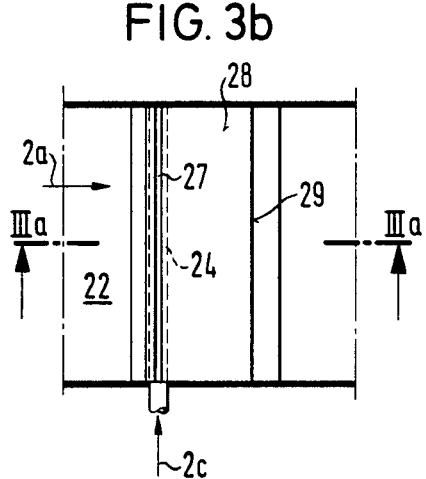

The atomizing device illustrated in FIGS. 3a and 3b comprises one or more nozzles 21 that have a rectangular cross section and are disposed in the inlet channel 2a. Each individual nozzle comprises a Venturi channel 22, 23 and an atomizer edge means 29 that is disposed therein. Via a distribution passage 24 disposed in each of the edge means 29, the atomizing material flows out of a gap 27 and forms a film on a wall 28. The atomizing medium flows over the wall 28 and over the other side of the atomizer edge means 29 via an aperture 30.

Figure 4A:
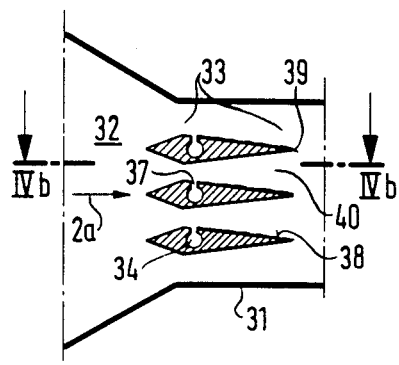
Figure 4B:
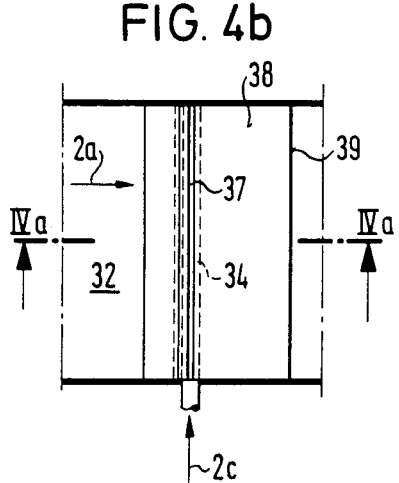

The embodiment illustrated in FIGS. 4a and 4b shows one or more atomizer edge means 39 that are similar to the embodiment just described. These means 39 are disposed in a Venturi-like intake channel 32, 33 of each nozzle 31 of the washer. As in the previous embodiment, the atomizing material flows through a distribution passage 34, out of a gap 37, and forms a film on the wall 38. The atomizing medium flows over this wall via the aperture 40.

Figure 5A:
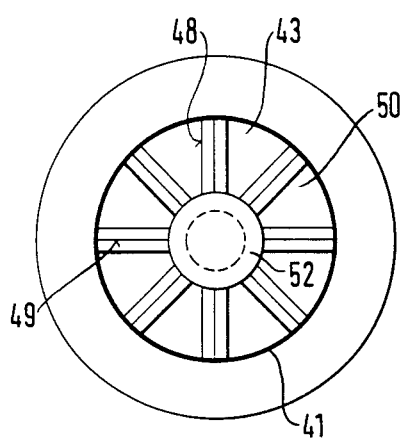
Figure 5B:
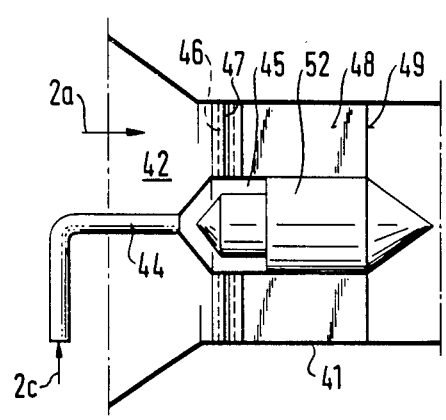
Figure 6A:
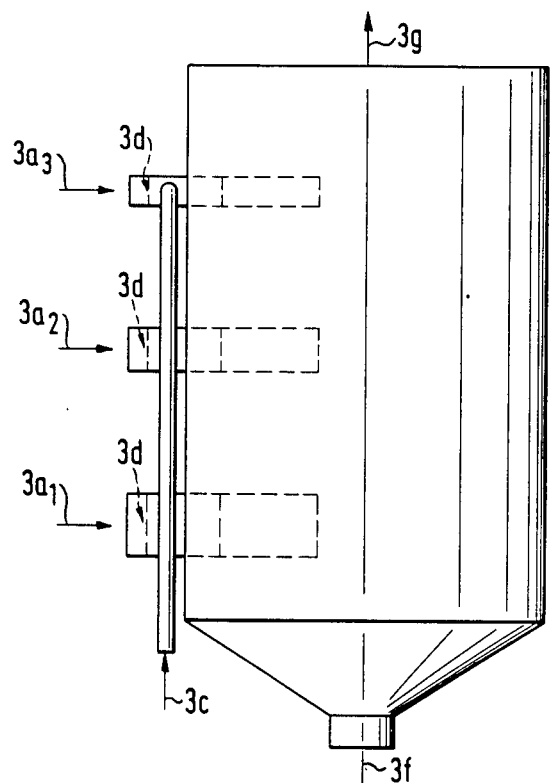
Figure 6B:
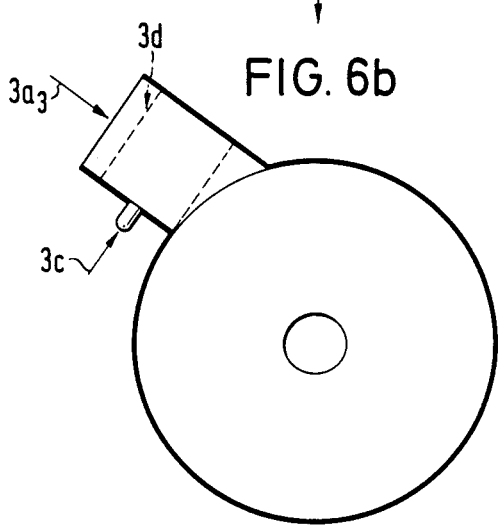

The embodiment illustrated in FIGS. 5a and 5b shows a plurality of atomizer edge means 49 disposed in an axially symmetrical Venturi-like intake channel 42, 43 of each nozzle 41 of the wet washer; the means 49 are disposed radially on a hub 52. The atomizing material flows via an inlet 2c into a tubular conduit 44 that opens into an annular channel 45 in the hub 52. The atomizing medium flows further via distribution channels 46, and via openings 47, onto the walls 48.

FIGS. 6*a* and 6*b* illustrate a further exemplary embodiment of a wet washer of average to large capacity. This wet washer has a plurality of tangential inlets, such as the inlets $3a_1$, $3a_2$, and $3a_3$. Each of these inlets, and the associated atomizing devices 3*d*, can have the configuration of the embodiments illustrated in FIGS. 2*a* to 5*b*. The quantitative distribution of flue gas and additive suspension to the inlets is effected in such a way that the flue gas predominantly flows into the lower inlets, and the suspension flows into the upper inlets.

The present invention is, of course, in no way restricted to the specific disclosure of the specification and drawings, but also encompasses any modifications within the scope of the appended claims.

What we claim is:

1. A method of scrubbing flue gas that is charged with noxious material, with scrubbing being accomplished via flowable absorbing material in a gas-scrubbing unit having an atomizing device with at last one independent nozzle that has an outlet and in which, pursuant to the air flow atomization principle, the absorbing material, as atomizing material, is atomized in parallel flow with a gas, as an atomizing medium, to form a fine droplet stream while at the same time the atomizing material and the atomizing medium are intensively mixed; said method includes the steps of:

- providing each nozzle with edge means having two sides;
- introducing atomizing material into a given nozzle in such a way that said material forms a film on one side of said edge means;
- splitting each atomizing medium stream into two partial streams;
- passing one of said partial streams through a given nozzle in such a way that it passes over said film of atomizing material on one side of said edge means in the direction toward said outlet of said nozzle, so that said film of atomizing material is forced toward said outlet, where said film is atomized, via said edge means, as it passes thereover, to form a fine droplet stream; and
- passing the other of said partial streams through said given nozzle on that side of said edge means remote from said film of atomizing material, and mixing this other partial stream with said fine droplet stream.

2. A method according to claim 1, which includes the steps of providing, as an independent nozzle, an axially symmetrical nozzle, and swirling at least one of said atomizing material stream and said atomizing medium stream in the same direction of rotation.

3. A method according to claim 1, which includes the steps of providing, as an independent nozzle, an axially symmetrical nozzle, and swirling at least one of said atomizing material stream and said atomizing medium stream in opposite directions of rotation.

4. A method according to claim 1, which includes the step of using, as said atomizing medium, one of the group consisting of: air, steam, and at least a partial stream of the flue gas that is to be scrubbed.

5. A method according to claim 1, which includes the step of using, as said atomizing material, an additive suspension of water and one of the group consisting of calcium hydroxide and calcium carbonate, with said suspension having a solid matter content of between 6 and 30% by weight.

6. A method according to claim 1, which includes the step of introducing said atomizing medium and said atomizing material into a given nozzle at a mass flow ratio of at least 0.3.

7. A method according to claim 1, which includes the steps of carrying out said flue gas scrubbing in a wet flue gas wash, and introducing said atomizing medium into a given nozzle at a pressure of at least 100 mm column of water to produce the required droplet size.

8. A method according to claim 1, which includes the steps of carrying out said flue gas scrubbing in a spray-absorption-dryer, and introducing said atomizing medium into a given nozzle at greater than 500 mm column of water at a mass flow ratio of atomizing medium to atomizing material of less than 1.

9. A method according to claim 1, which includes the steps of carrying out said flue gas scrubbing in a spray-absorption-dryer, and introducing said atomizing medium into a given nozzle at at least 100 mm column of water at a mass flow ratio of atomizing medium to atomizing material of greater than 1.

10. A method according to claim 1, which includes the steps of using a dry additive as said atomizing material, and conditioning said flue gas with water ahead of each nozzle.

11. A method according to claim 1, which includes the steps of operating said gas-scrubbing unit at partial load at a mass flow ratio between atomizing medium and atomizing material of greater than 2, and maintaining an atomizing quality by varying the individual mass flows nearly independently of one another.

12. A method according to claim 1, which includes the steps of operating said gas-scrubbing unit at partial load at a mass flow ratio between atomizing medium and atomizing material of 0.3 to 2, and providing a required atomizing quality by varying the individual mass flows nearly independently of one another.

13. An apparatus for scrubbing flue gas that is charged with noxious material, with scrubbing being accomplished via flowable absorbing material in a gas-scrubbing unit having an atomizing device with at least one independent nozzle that has an outlet and in which, pursuant to the air flow atomization principle, the absorbing material, as atomizing material, is atomized in parallel flow with a gas, as an atomizing medium, to form a fine droplet stream while at the same time the atomizing material and the atomizing medium are intensively mixed; each nozzle also has inlet means for said atomizing material and for said atomizing medium; each nozzle further comprises:

edge means ending adjacent said nozzle outlet and having two sides; said nozzle has first opening means, disposed remote from said nozzle outlet, for supplying atomizing material to one of said sides of said edge means; said nozzle has second opening means, also disposed remote from said nozzle outlet, for supplying a first partial stream of atomizing medium to that side of said edge means that is supplied with said atomizing material; said nozzle also has a third opening means for supplying a second partial stream of atomizing medium to the other side of said edge means.

14. An apparatus according to claim 13, in which each independent nozzle is an axially symmetrical nozzle, and in which said first opening means for said atomizing material is an annular gap disposed over the entire periphery of said nozzle.

15. An apparatus according to claim 13, in which each independent nozzle is an axially symmetrical nozzle, and in which said first opening means for said atomizing material is a number of individual openings disposed over the entire periphery of said nozzle.

16. An apparatus according to claim 13, in which each independent nozzle is an axially symmetrical nozzle, and is provided with tangential inlet means to produce parallel or countercurrent swirling for the flow of at least one of said atomizing medium and said atomizing material.

17. An apparatus according to claim 13, in which each independent nozzle is an axially symmetrical nozzle, and is provided with elements to produce parallel or countercurrent swirling for the flow of at least one of said atomizing medium and said atomizing material.

18. An apparatus according to claim 13, in which each independent nozzle is a flat-type nozzle, and in which said first opening means for said atomizing material is a linear gap disposed over the entire width of said nozzle.

19. An apparatus according to claim 13, in which each independent nozzle is a flat-type nozzle, and in which said first opening means for said atomizing material is a number of individual openings disposed over the entire width of said nozzle.

* * * * *